US012313016B2

(12) United States Patent
Matsumoto et al.

(10) Patent No.: US 12,313,016 B2
(45) Date of Patent: May 27, 2025

(54) STOP SYSTEM FOR ENGINE OF WORK MACHINE, AND STOP METHOD FOR ENGINE OF WORK MACHINE

(71) Applicant: KOMATSU LTD., Tokyo (JP)

(72) Inventors: Hayato Matsumoto, Tokyo (JP);
Shunsuke Sugimura, Tokyo (JP);
Takehiro Shibata, Tokyo (JP);
Tomofumi Hokari, Tokyo (JP);
Yuichiro Yasuda, Tokyo (JP); Kenji Nozaki, Tokyo (JP); Tomotaka Komatsu, Tokyo (JP); Yosuke Yamagoe, Tokyo (JP); Ryohei Kikuzawa, Tokyo (JP); Kengo Yamamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/688,854

(22) PCT Filed: Sep. 22, 2022

(86) PCT No.: PCT/JP2022/035394
§ 371 (c)(1),
(2) Date: Mar. 4, 2024

(87) PCT Pub. No.: WO2023/054171
PCT Pub. Date: Apr. 6, 2023

(65) Prior Publication Data
US 2024/0369026 A1    Nov. 7, 2024

(30) Foreign Application Priority Data

Sep. 30, 2021   (JP) .................... 2021-161083

(51) Int. Cl.
*F02D 41/04*  (2006.01)
*F02D 17/04*  (2006.01)

(52) U.S. Cl.
CPC .......... *F02D 41/042* (2013.01); *F02D 17/04* (2013.01)

(58) Field of Classification Search
CPC ................. F02D 41/042; F02D 17/04
See application file for complete search history.

(56) References Cited

U.S. PATENT DOCUMENTS

2006/0137652 A1   6/2006  Umezu
2010/0030456 A1   2/2010  Chominsky et al.
(Continued)

FOREIGN PATENT DOCUMENTS

DE    112013000188 B4 *  6/2020   ............... B60K 6/28
JP    2004-239165 A      8/2004
(Continued)

OTHER PUBLICATIONS

Machine Translation DE 112013000188 B4 PDF File Name: "DE112013000188B4_Machine_Translation.pdf" (Year: 2020).*
(Continued)

*Primary Examiner* — Grant Moubry
*Assistant Examiner* — Ruben Picon-Feliciano
(74) *Attorney, Agent, or Firm* — Global IP Counselors, LLP

(57) ABSTRACT

A stop system for an engine of a work machine includes an engine stop control unit and an engine stop control suspension unit. The engine stop control unit, in a case in which there is a stop instruction that instructs to stop the engine of the work machine, performs delayed stop control to delay the stop of the engine until a predetermined condition is established, and then stops the engine. The engine stop control suspension unit, in a case in which there is a cancellation instruction to cancel the stop instruction, suspends the delayed stop control when work equipment of the work machine is in a locked state, and continues to perform
(Continued)

the delayed stop control when the work equipment is in an unlocked state.

8 Claims, 11 Drawing Sheets

(56) References Cited

U.S. PATENT DOCUMENTS

| | | | |
|---|---|---|---|
| 2015/0075490 A1 | 3/2015 | Hull et al. | |
| 2017/0009726 A1 | 1/2017 | Johnson et al. | |
| 2017/0030054 A1* | 2/2017 | Okumura | H04N 7/18 |
| 2017/0114526 A1* | 4/2017 | Yasuda | E02F 9/264 |
| 2017/0282907 A1* | 10/2017 | Uji | B60W 30/192 |
| 2018/0295357 A1* | 10/2018 | Okumura | H04N 17/04 |
| 2020/0032484 A1* | 1/2020 | O'Donnell | E02F 9/205 |

FOREIGN PATENT DOCUMENTS

| | | | | | |
|---|---|---|---|---|---|
| JP | 2005-307492 A | | 11/2005 | | |
| JP | 5762509 B2 | * | 8/2015 | | |
| JP | 2017187000 A | * | 10/2017 | | |
| JP | 2017187002 A | * | 10/2017 | | |
| WO | WO-2005054649 A1 | * | 6/2005 | | E02F 9/2004 |
| WO | WO-2014192320 A1 | * | 12/2014 | | F01N 13/1805 |
| WO | WO-2018221659 A1 | * | 12/2018 | | B60Q 5/001 |

OTHER PUBLICATIONS

Machine Translation of WO 2014192320 A1 PDF File Name: "WO2014192320A1_Machine_Translation.pdf" (Year: 2014).*
Machine Translation of WO 2005054649 A1 PDF File Name: "WO2005054649A1_Machine_Translation.pdf" (Year: 2005).*
Machine Translation of WO 2018221659 A1 PDF File Name: "WO2018221659A1_Machine_Translation.pdf" (Year: 2018).*
Machine Translation of JP-2017187000-A PDF File Name: "JP2017187000A_Machine_Translation.pdf" (Year: 2017).*
Machine Translation of JP-5762509-B2 PDF File Name: "JP5762509B2_Machine_Translation.pdf" (Year: 2015).*
Machine Translation of P-2017187002-A PDF File Name: "JP2017187002A_Machine_Translation.pdf" (Year: 2017).*

* cited by examiner

STOP SYSTEM FOR ENGINE OF WORK MACHINE, AND STOP METHOD FOR ENGINE OF WORK MACHINE

CROSS-REFERENCE TO RELATED APPLICATIONS

This application is a U.S. National stage application of International Application No. PCT/JP2022/035394, filed on Sep. 22, 2022. This U.S. National stage application claims priority under 35 U.S.C. § 119(a) to Japanese Patent Application No. 2021-161083, filed in Japan on Sep. 30, 2021, the entire contents of which are hereby incorporated herein by reference.

BACKGROUND

Technical Field

The present disclosure relates to a stop system for an engine of a work machine and a stop method for an engine of a work machine.

Background Information

United States Patent Application, Publication No. 2015/075490 discloses a technique for delaying stop of an engine in a case where an exhaust system temperature exceeds a temperature threshold in response to an engine stop command given by an operator. In addition, in the technique disclosed in United States Patent Application, Publication No. 2015/075490, while the stop of the engine is delayed, the operator can perform a predetermined operation to immediately stop the engine.

SUMMARY

However, the technique disclosed in United States Patent Application, Publication No. 2015/075490 does not include a configuration for suspending control to delay and stop the engine to return to a normal engine operation while the stop of the engine is delayed.

The present invention has been made in view of the above circumstances, and an object thereof is to provide a stop system for an engine of a work machine and a stop method for an engine of a work machine capable of, while control to delay stop of an engine is performed, suspending the control.

An aspect of the present disclosure is a stop system for an engine of a work machine including: an engine stop control unit configured to, in a case where there is a stop instruction that instructs to stop the engine of the work machine, perform delayed stop control to delay the stop of the engine until a predetermined condition is established, and then stop the engine: and an engine stop control suspension unit configured to, in a case where there is a cancellation instruction to cancel the stop instruction, suspend the delayed stop control when work equipment of the work machine is in a locked state, and continue to perform the delayed stop control when the work equipment is in an unlocked state.

According to the stop system for an engine of a work machine and the stop method for an engine of a work machine of the present disclosure, while control to delay stop of an engine is performed, the control can be suspended.

DETAILED DESCRIPTION OF EMBODIMENT(S)

Hereinafter, embodiments of the present disclosure will be described with reference to the drawings. In each figure, the same reference signs are used for the same or corresponding configurations, and the description thereof will be omitted as appropriate.

Configuration of Work Machine 100

Figure 1:
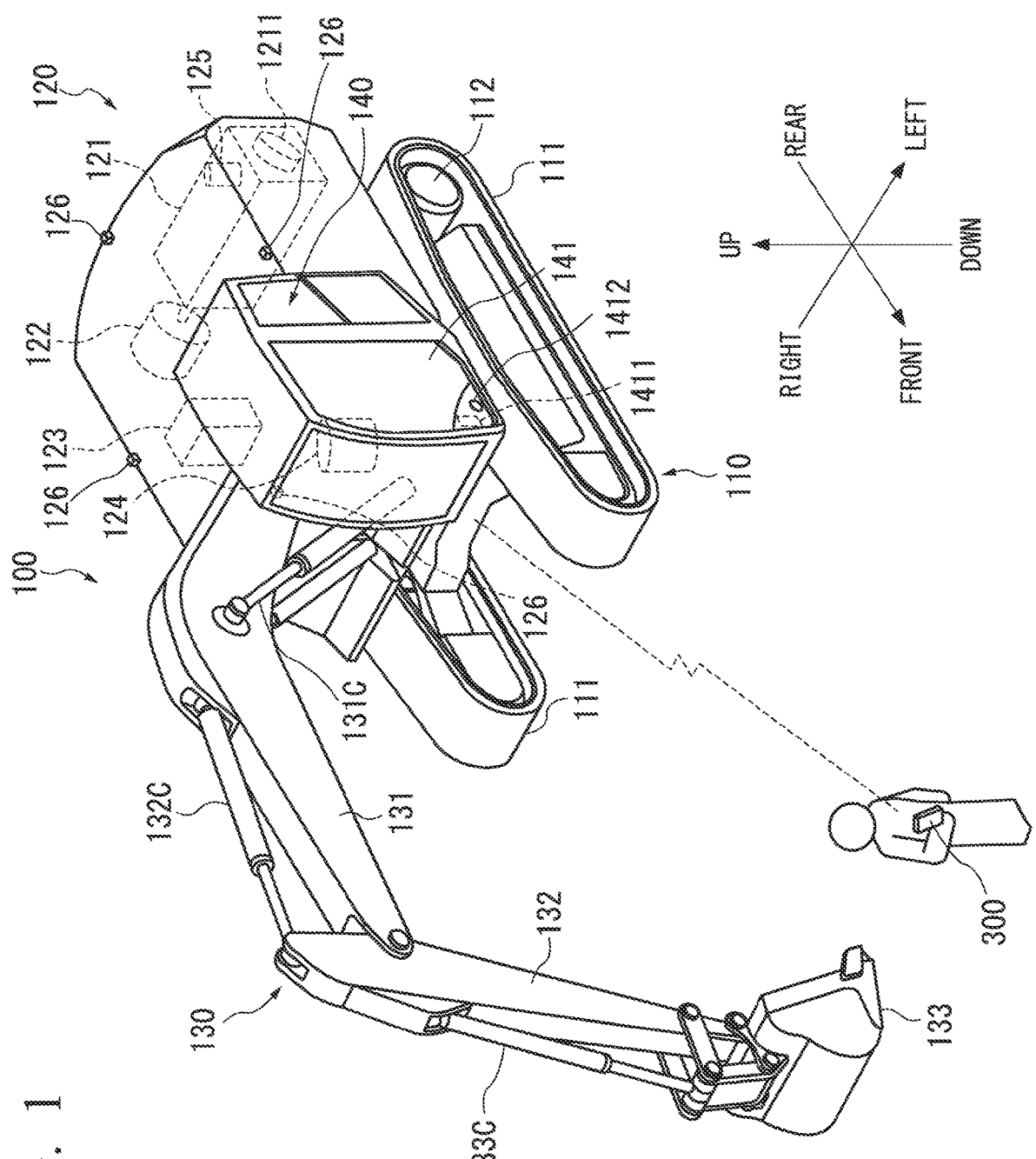
FIG. 1 is a schematic diagram showing a configuration of a work machine according to an embodiment of the present disclosure.

FIG. 1 is a schematic diagram showing a configuration of a work machine 100 according to an embodiment of the present disclosure. The work machine 100 operates at a construction site and constructs a construction target such as earth. The work machine 100 according to the embodiment of the present disclosure is, for example, a hydraulic excavator. However, the work machine of the present disclosure may be another work machine such as a dump truck, a wheel loader, or a motor grader. The work machine 100 includes an undercarriage 110, a swing body 120, work equipment 130, and a cab 140. The work machine 100 according to the embodiment of the present disclosure authenticates an operator by performing wireless communication with an operator terminal 300 such as a smartphone owned by the operator using a short-range wireless communication method.

The undercarriage 110 supports the work machine 100 so that the work machine 100 can travel. The undercarriage 110 includes two track shoes 111 provided on left and right sides and two traveling motors 112 for respectively driving the track shoes 111. The swing body 120 is supported by the undercarriage 110 to be swingable around a swing center.

The work equipment 130 is driven by hydraulic pressure. The work equipment 130 is supported by a front portion of the swing body 120 so that the work equipment 130 can be driven in an up-down direction. The cab 140 is a space in which the operator board and operates the work machine 100. The cab 140 is provided on a left front portion of the swing body 120. In the present embodiment, as shown in FIG. 1, the up-down direction, a left-right direction, and a front-rear direction are determined with the swing body 120 as a reference. In addition, a portion of the swing body 120 to which the work equipment 130 is attached is referred to as a front portion. In addition, in the swing body 120, a portion on an opposite side, a portion on a left side, and a portion on a right side with respect to the front portion are referred to as a rear portion, a left portion, and a right portion.

Configuration of Swing Body 120

The swing body 120 includes an engine 121, a hydraulic pump 122, a control valve 123, a swing motor 124, and a fuel injection device 125. The engine 121 is a prime mover that drives the hydraulic pump 122. The engine 121 is an example of a power source. A cell motor 1211 is provided in the engine 121. The engine 121 is started by rotation of the cell motor 1211.

The hydraulic pump 122 is a variable displacement pump driven by the engine 121. The hydraulic pump 122 supplies hydraulic oil to each actuator via the control valve 123. The actuators include a boom cylinder 131C, an arm cylinder 132C, a bucket cylinder 133C, the traveling motor 112, and the swing motor 124. The control valve 123 controls a flow rate of the hydraulic oil supplied from the hydraulic pump 122.

The swing motor 124 is driven by the hydraulic oil supplied from the hydraulic pump 122 via the control valve 123 to swing the swing body 120. The fuel injection device 125 injects fuel into the engine 121.

Configuration of Work Equipment 130

The work equipment 130 includes a boom 131, an arm 132, a bucket 133, the boom cylinder 131C, the arm cylinder 132C, and the bucket cylinder 133C.

A proximal end portion of the boom 131 is attached to the swing body 120 via a boom pin. The arm 132 connects the boom 131 and the bucket 133. A proximal end portion of the arm 132 is attached to a distal end portion of the boom 131 via an arm pin. The bucket 133 includes blades for excavating earth or the like, and an accommodating portion that accommodates the excavated earth. A proximal end portion of the bucket 133 is attached to a distal end portion of the arm 132 via a bucket pin.

The boom cylinder 131C is a hydraulic cylinder for operating the boom 131. A proximal end portion of the boom cylinder 131C is attached to the swing body 120. A distal end portion of the boom cylinder 131C is attached to the boom 131. The arm cylinder 132C is a hydraulic cylinder for driving the arm 132. A proximal end portion of the arm cylinder 132C is attached to the boom 131. A distal end portion of the arm cylinder 132C is attached to the arm 132. The bucket cylinder 133C is a hydraulic cylinder for driving the bucket 133. A proximal end portion of the bucket cylinder 133C is attached to the arm 132. A distal end portion of the bucket cylinder 133C is attached to a link member connected to the bucket 133.

Configuration of Cab 140

A door 141 for the operator to board is provided on a left surface of the cab 140. The door 141 is provided with a lock actuator 1411 for locking the door 141 and a door switch 1412 for unlocking the door 141.

Figure 2:
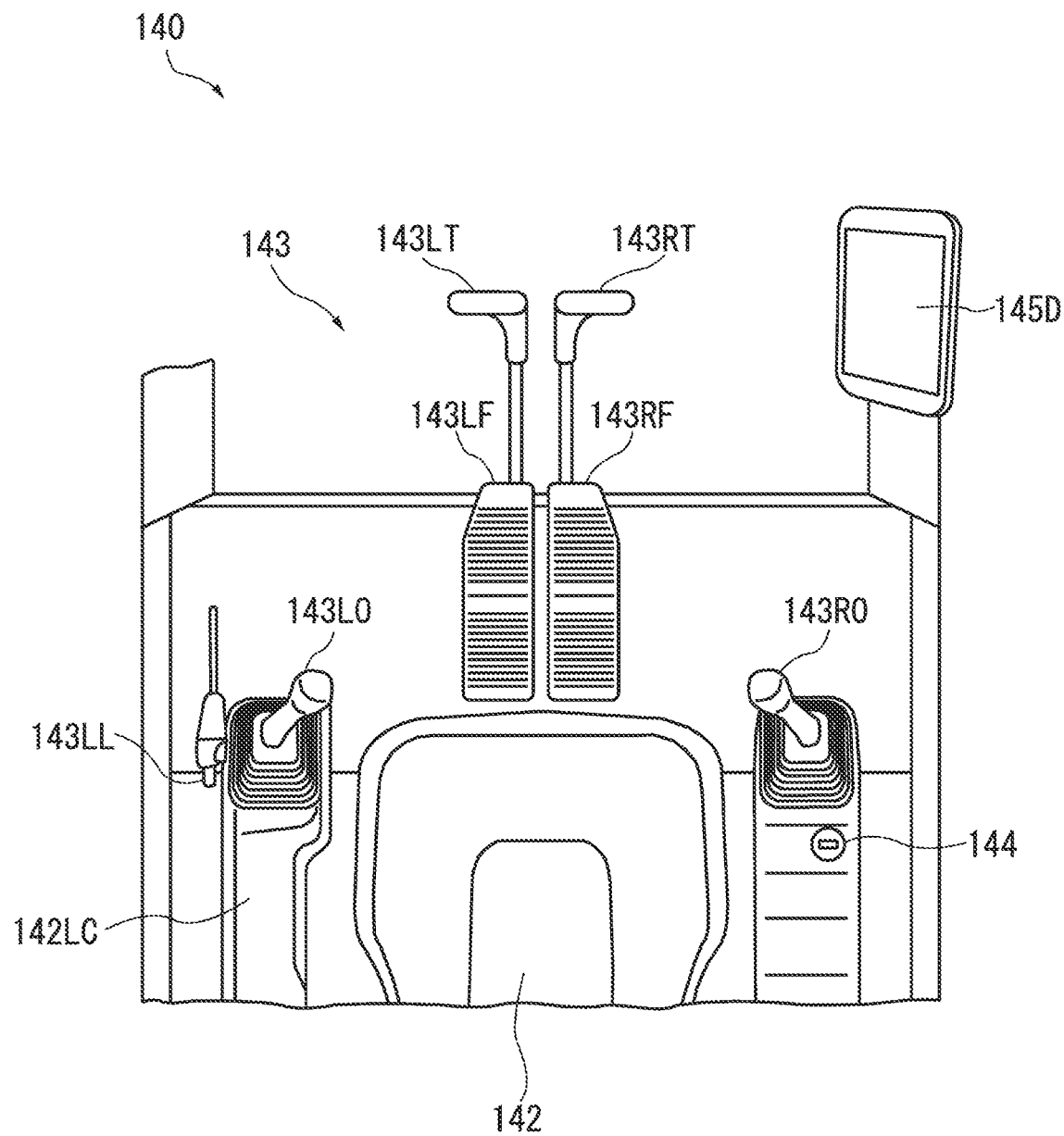
FIG. 2 is a diagram showing an internal configuration of a cab according to the embodiment of the present disclosure.
Figure 3:
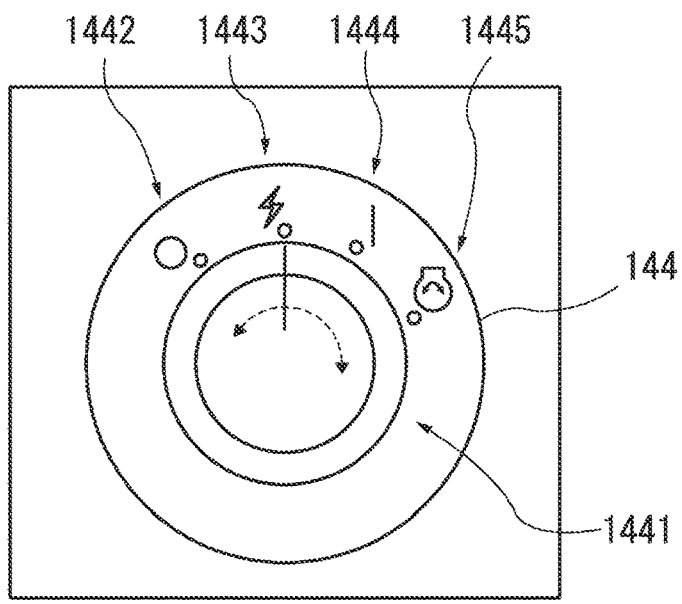
FIG. 3 is a diagram showing a configuration of a rotary switch according to the embodiment of the present disclosure.
Figure 4:
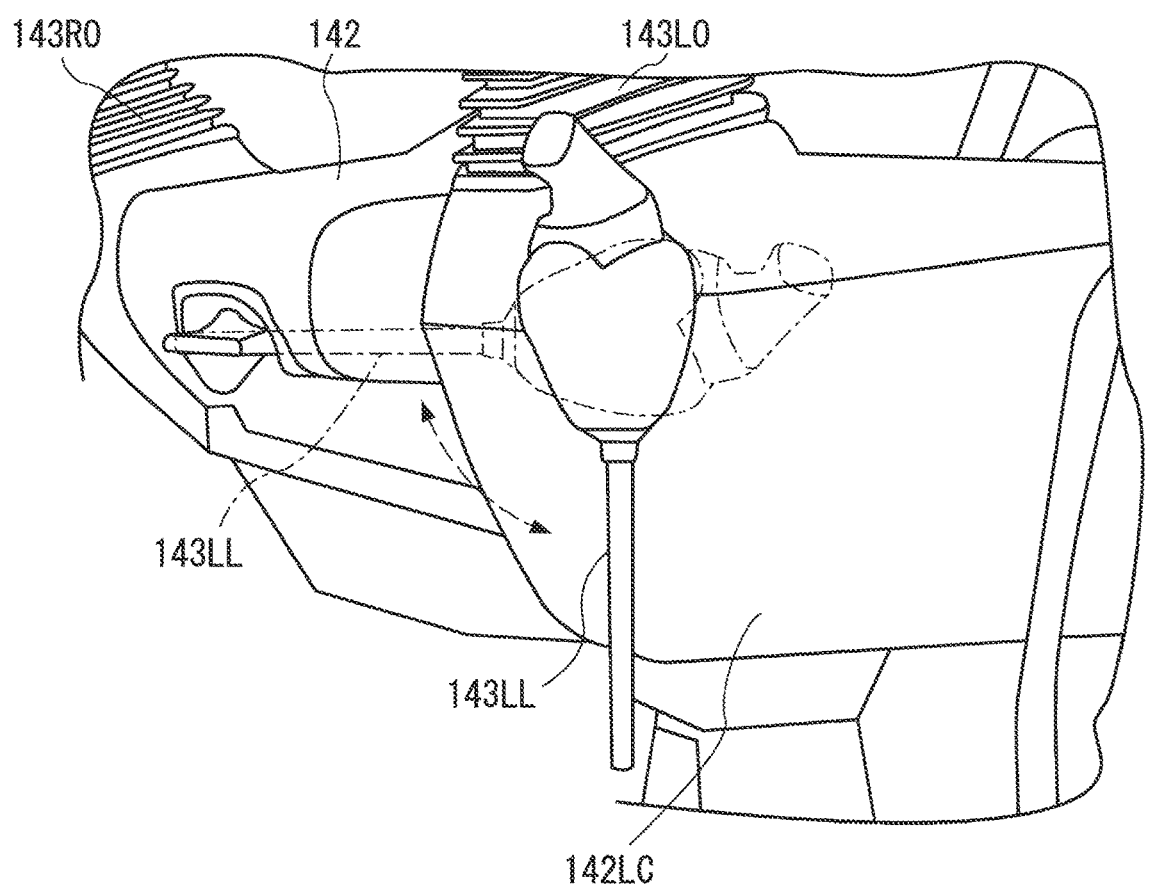
FIG. 4 is a diagram showing an operation example of a lock lever according to the embodiment of the present disclosure.

FIG. 2 is a diagram showing an internal configuration of the cab 140 according to the embodiment of the present disclosure. FIG. 3 is a diagram showing a configuration of a rotary switch 144 according to the embodiment of the present disclosure. FIG. 4 is a diagram showing an operation example of a lock lever 143LL according to the embodiment of the present disclosure. In the cab 140, a driver seat 142, an operation device 143, the rotary switch 144, and a touch panel 145D are provided. As shown in FIG. 3, the rotary switch 144 is a switch that takes four positions, an OFF position 1442, an ACC (accessory) position 1443, an IG (ignition) position 1444, and an ST (start) position 1445 when a rotating portion 1441 is rotated as indicated by a dashed arrow. When a finger is released from the rotary switch 144 at the ST position 1445, the rotary switch 144 automatically returns to the IG position 1444 by a spring mechanism (not shown). At the OFF position 1442, an instruction to stop the engine 121 is given. At the ACC position 1443, an instruction to stop the engine 121 is given, and an instruction to bring a predetermined device into an operating state is given. At the IG position 1444, an instruction to bring the engine 121 into an operating state is given. At the ST position 1445, an instruction to start the engine 121 is given.

In the present disclosure, the rotary switch 144 is an example of an engine ignition switch. The ignition switch can be configured as, for example, a key switch or a push switch instead of the rotary switch. The rotary switch 144 outputs an electric signal corresponding to the OFF position 1442, the ACC position 1443, the IG position 1444, or the ST position 1445.

The operation device 143 is a device for driving the undercarriage 110, the swing body 120, and the work equipment 130 by a manual operation of the operator. The operation device 143 includes a left operation lever 143LO, a right operation lever 143RO, a left foot pedal 143LF, a right foot pedal 143RF, a left traveling lever 143LT, a right traveling lever 143RT, and the lock lever 143LL.

The left operation lever 143LO is provided on a left side of the driver seat 142. The right operation lever 143RO is provided on a right side of the driver seat 142.

The left operation lever 143LO is an operation mechanism for the swing body 120 to perform a swinging operation and for causing the arm 132 to perform an excavating or dumping operation. Specifically, when the operator of the work machine 100 tilts the left operation lever 143LO forward, the arm 132 performs the dumping operation. In addition, when the operator of the work machine 100 tilts the left operation lever 143LO rearward, the arm 132 performs the excavating operation. In addition, when the operator of the work machine 100 tilts the left operation lever 143LO in a rightward direction, the swing body 120 swings rightward. In addition, when the operator of the work machine 100 tilts the left operation lever 143LO in a leftward direction, the swing body 120 swings leftward. In another embodiment, the swing body 120 may swing rightward or swing leftward in a case where the left operation lever 143LO is tilted in the front-rear direction, and the arm 132 may perform the excavating operation or the dumping operation in a case where the left operation lever 143LO is tilted in the left-right direction.

The right operation lever 143RO is an operation mechanism for causing the bucket 133 to perform an excavating or dumping operation and for causing the boom 131 to perform a raising or lowering operation. Specifically, when the operator of the work machine 100 tilts the right operation lever 143RO forward, the lowering operation of the boom 131 is performed. In addition, when the operator of the work machine 100 tilts the right operation lever 143RO rearward, the raising operation of the boom 131 is performed. In addition, when the operator of the work machine 100 tilts the right operation lever 143RO in the rightward direction, the dumping operation of the bucket 133 is performed. In addition, when the operator of the work machine 100 tilts the right operation lever 143RO in the leftward direction, the excavating operation of the bucket 133 is performed. In another embodiment, the bucket 133 may perform the dumping operation or the excavating operation in a case where the right operation lever 143RO is tilted in the front-rear direction, and the boom 131 may perform the raising operation or the lowering operation when the right operation lever 143RO is tilted in the left-right direction.

The left foot pedal 143LF is disposed on a left side of a floor surface in front of the driver seat 142. The right foot pedal 143RF is disposed on a right side of the floor surface in front of the driver seat 142. The left traveling lever 143LT is pivotally supported by the left foot pedal 143LF, and is configured such that inclination of the left traveling lever 143LT and pressing down of the left foot pedal 143LF are linked to each other. The right traveling lever 143RT is pivotally supported by the right foot pedal 143RF, and is configured such that inclination of the right traveling lever 143RT and pressing down of the right foot pedal 143RF are linked to each other.

The left foot pedal 143LF and the left traveling lever 143LT correspond to rotational drive of the left track shoe of the undercarriage 110. Specifically, when the operator of the work machine 100 tilts the left foot pedal 143LF or the left traveling lever 143LT forward, the left track shoe rotates in a forward movement direction. In addition, when the operator of the work machine 100 tilts the left foot pedal 143LF or the left traveling lever 143LT rearward, the left track shoe rotates in a backward movement direction.

The right foot pedal 143RF and the right traveling lever 143RT correspond to rotational drive of the right track shoe of the undercarriage 110. Specifically, when the operator of the work machine 100 tilts the right foot pedal 143RF or the right traveling lever 143RT forward, the right track shoe rotates in the forward movement direction. In addition, when the operator of the work machine 100 tilts the right foot pedal 143RF or the right traveling lever 143RT rearward, the right track shoe rotates in the backward movement direction.

The lock lever 143LL is a safety device provided to prohibit the operator from unintentionally operating an actuator such as the work equipment 130 in a non-operating state. The lock lever 143LL is disposed along a side surface of a left cabinet 142LC, which stands upright on a left side of the driver seat 142, in a rotatable state between a locked position and an unlocked position. In FIG. 4, the lock lever 143LL indicated by solid lines is in a state of the locked position, and the lock lever 143LL indicated by chain lines is in a state of the unlocked position. By placing the lock lever 143LL in the locked position, control of the hydraulic oil by the control valve 123 is stopped. In addition, by placing the lock lever 143LL in the locked position, a switch that operates in conjunction with the lock lever 143LL is turned on. The state in which the lock lever 143LL is at the locked position is an example in which the work equipment 130 is in a locked state. In addition, the state in which the lock lever 143LL is at the unlocked position is an example in which the work equipment 130 is in an unlocked state.

In a case where the lock lever 143LL is at the locked position, the lock lever 143LL rotates to a position hidden by a side surface side of the left cabinet of the driver seat 142, that is, a position retreated from a passage between the door 141 and the driver seat 142 and is locked. Accordingly, the operator can move back and forth between the door 141 and the driver seat 142. On the other hand, in a case where the lock lever 143LL is at the unlocked position, the lock lever 143LL rotates to a position inclined forward so as to close the passage portion between the driver seat 142 and the door 141 and is locked. Accordingly, in the case where the lock lever 143LL is at the unlocked position, when the operator tries to leave the driver seat 142, the lock lever 143LL becomes an obstacle, so that the operator cannot get in and out of the driver seat 142. Therefore, the operator can be prevented from leaving the cab 140 in a state in which an actuator such as the work equipment 130 is operable. In addition, ON and OFF states of the switch that operates in conjunction with the lock lever 143LL are monitored, for example, by a control controller 205 which will be described later.

Configuration Example of Camera

The swing body 120 is provided with a plurality of cameras 126 that capture images of surroundings of the work machine 100. In the example shown in FIG. 1, the swing body 120 is provided with four cameras 126, which include a camera that captures an image of a front region, a camera that captures an image of a left side region, a camera that captures an image a rear region, and a camera that captures an image of a right side region of surroundings of the swing body 120.

Configuration of Control System 145

Figure 5:
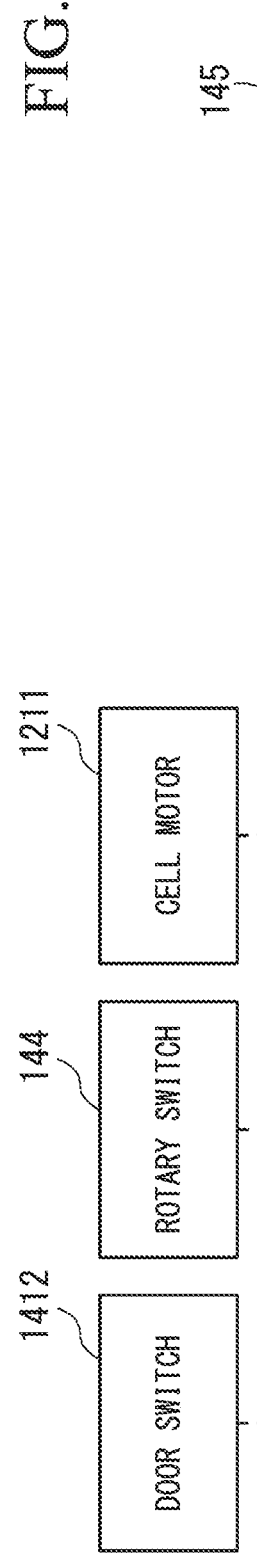
FIG. 5 is a schematic block diagram showing a hardware configuration of a control system according to the embodiment of the present disclosure.

FIG. 5 is a schematic block diagram showing a hardware configuration of a control system 145 according to the embodiment of the present disclosure. In FIG. 5, solid lines indicate power lines, and dashed lines indicate signal lines. In addition, in FIG. 5, dot-dashed lines indicate wireless communication.

The control system 145 includes a power supply unit 201, a starter signal unit 202, a gateway function controller 203, a monitor controller 204, the control controller 205, and an engine controller 206. The starter signal unit 202, the gateway function controller 203, the monitor controller 204, the control controller 205, and the engine controller 206 are connected to each other via an in-vehicle network such as a controller area network (CAN) or Ethernet (registered trademark). The power supply unit 201 supplies electric energy to each device constituting the control system 145.

The starter signal unit 202 receives signals as inputs from the door switch 1412, the rotary switch 144, the operator terminal 300, and the monitor controller 204. The starter signal unit 202 outputs a control signal such as a start signal to the gateway function controller 203, the monitor controller 204, the control controller 205, the engine controller 206, the lock actuator 1411, or the cell motor 1211 based on the input signals. The controller to which the start signal is input is started and operated by the electric energy supplied by the power supply unit 201. The starter signal unit 202 is an example of a starting unit that starts the control controller 205. The starter signal unit 202 always operates by receiving the electric energy supplied from the power supply unit 201 even when other controllers are in a stopped state. On the other hand, the starter signal unit 202 may be configured such that, when the work machine 100 is not started, only a communication unit that communicates with the operator terminal 300 enters a start-up state and other configurations are in a paused state, or may be configured to start intermittently.

In addition, the starter signal unit 202 outputs control signals such as an engine delayed shutdown (EDS) signal, an accessory-on (ACCON) signal, and an ignition-on (IGON) signal to the monitor controller 204, the control controller 205, and the engine controller 206 via the gateway function controller 203. The engine delayed shutdown (EDS) signal is a signal indicating a state in which delayed stop control is performed. In the present embodiment, the delayed stop control is control to, in a case where there is a stop instruction that instructs to stop the engine 121 of the work machine 100, delay the stop of the engine 121 until a predetermined condition is established, and then stop the engine 121. In addition, for example, the starter signal unit 202 determines whether or not to start the delayed stop control, whether or not to suspend the delayed stop control, whether or not to end the delayed stop control, and the like. A case where the EDS signal is on indicates that the delayed stop control is being performed, and a case where the EDS signal is off indicates that the delayed stop control is not being performed. Here, the predetermined condition is a condition for determining whether or not to stop the engine 121. The engine 121 is stopped in a case where the predetermined condition is established, and the engine 121 continues to operate under the delayed stop control in a case where the predetermined condition is not established. Examples of the predetermined condition include a condition in which a temperature in an exhaust system such as a temperature of a urea water injector in a urea SCR (Selective Catalytic Reduction) system, an engine-related temperature, or the like is equal to or less than a predetermined temperature threshold, and a state in which a duration of the operation of the engine 121 in a low-speed idling state is equal to or longer than a predetermined time threshold. The accessory-on (ACCON) signal is turned on in a case where the rotary switch 144 is at a position other than the OFF position 1442, and is turned off in a case where the rotary switch 144 is at the OFF position 1442. The ignition-on (IGON) signal is turned on at the IG position 1444 or the ST position 1445, and is turned off at the OFF position 1442 or the ACC position 1443, for example.

In addition, the starter signal unit 202 receives, as inputs, a signal indicating whether the lock lever 143LL is at the locked position or the unlocked position, a signal indicating a temperature and the like used when determining the predetermined condition in the delayed stop control, a signal indicating a determination result thereof, and the like from the monitor controller 204, the control controller 205, the engine controller 206, and the like via the gateway function controller 203.

The gateway function controller 203 relays communication between controllers such as the starter signal unit 202, the monitor controller 204, the control controller 205, and the engine controller 206.

The monitor controller 204 controls a display on the touch panel 145D included in the control system 145, and notifies of the occurrence of a touch operation of the touch panel 145D. The control system 145 according to another embodiment may include a monitor that does not have a touch input function, such as a liquid crystal display (LCD), and a physical button instead of the touch panel 145D. In this case, the monitor controller 204 controls a display on the monitor and notifies of the pressing of the physical button.

The control controller 205 acquires various data related to a hydraulic device that controls an operation of the work equipment 130 via a sensor (not shown), and outputs a control signal for controlling the hydraulic device according to an operation of the operation device 143. That is, the control controller 205 controls the drive of the boom cylinder 131C, the arm cylinder 132C, the bucket cylinder 133C, the traveling motor 112, the swing motor 124, or the like. The control controller 205 is an example of a vehicle body control unit that outputs a control signal for driving a vehicle body of the work machine 100 with the power supplied by the power source.

The engine controller 206 controls the engine 121 by acquiring various data related to the engine 121 via a sensor (not shown) and instructing the fuel injection device 125 of a fuel injection amount.

In addition, the monitor controller 204, the control controller 205, the engine controller 206, and the like receive the control signals such as the EDS signal, the ACCON signal, and the IGON signal from the starter signal unit 202, and performs preset processing based on the control signals such as the EDS signal, the ACCON signal, and the IGON signal. For example, in a case where the IGON signal is on or the ACCON signal is on, the monitor controller 204 performs a display of a screen of the touch panel 145D. For example, in a case where the IGON signal is off and the ACCON signal is off, the monitor controller 204 turns off the display of the screen of the touch panel 145D. For example, in a case where the EDS signal is on, the control controller 205 stops the drive of the work equipment 130. For example, in a case where the EDS signal is on, the engine controller 206 operates the engine 121 in a low-speed idling state. In addition, in a case where the IGON signal is off, the engine controller 206 stops the engine 121.

The control system 145 has a function of performing log-in processing of an operator boarding the cab 140 by the operation of the touch panel 145D. For example, the control system 145 may include a controller that performs the log-in processing, or the starter signal unit 202, the gateway function controller 203, and the monitor controller 204 may have a function of performing the log-in processing. Specifically, the control system 145 displays a selection screen for an operator ID on the touch panel 145D via the monitor controller 204, and receives a selection of the operator ID. In a case where the selected operator ID indicates an operator having an operation authority in close proximity to the work machine 100, the control system 145 authenticates that the operator boarding the cab 140 is the operator having the operation authority. The monitor controller 204 is an example of an authentication unit that authenticates the operator of the work machine 100.

Operator Terminal 300

The operator terminal 300 functions as a peripheral in a short-range wireless communication method by executing a pre-installed start-up program of the work machine 100. When the start-up program is executed, the operator terminal 300 displays a list of the work machines 100 and receives a selection of the work machine 100 to be started from the operator. When the selection of the work machine 100 is received, the operator terminal 300, for example, starts transmission of an advertising packet including the operator ID and a machine ID of the selected work machine 100.

Operation of Control System 145

Figure 6:
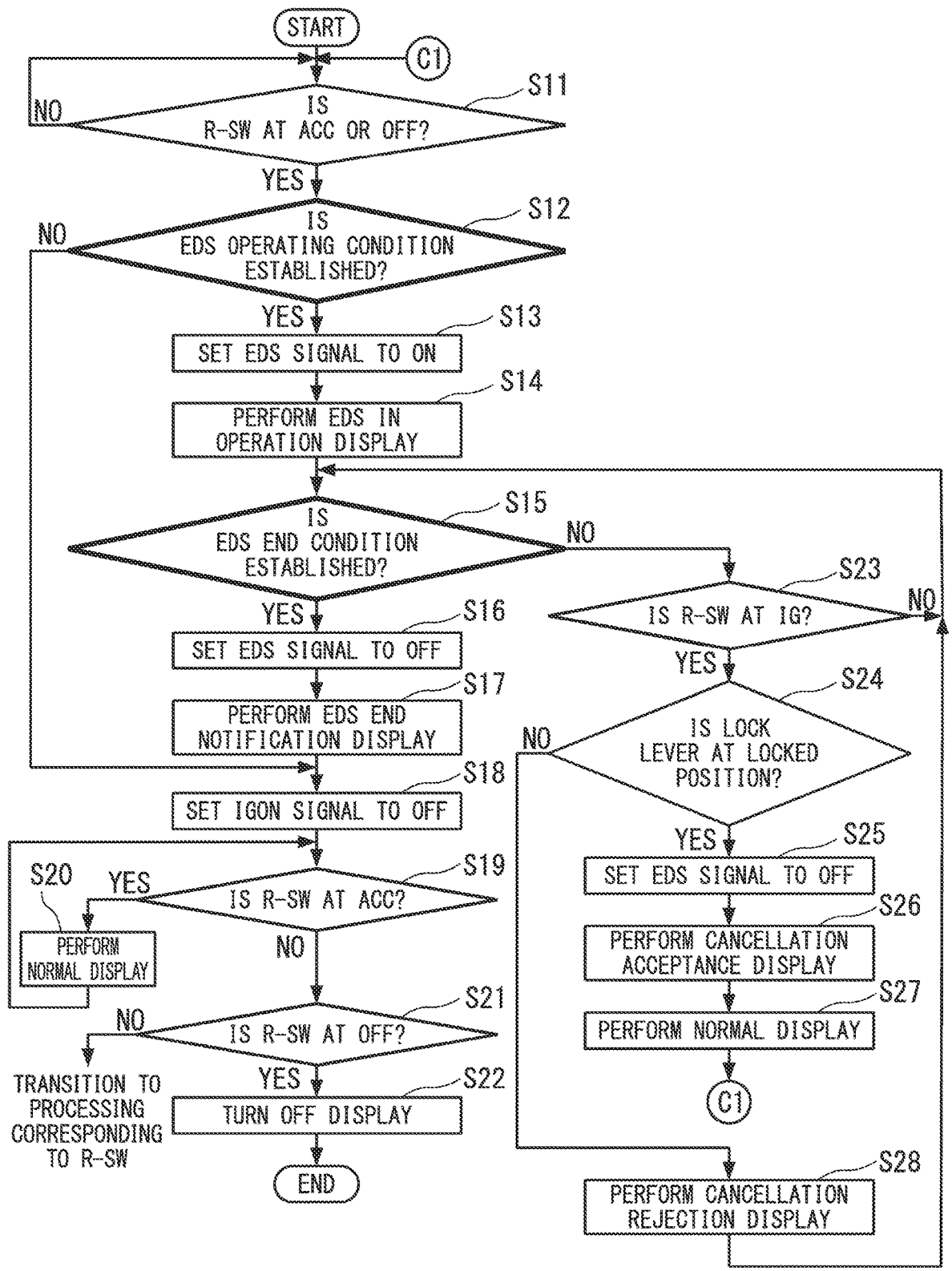
FIG. 6 is a flowchart showing an operation example of the control system according to the embodiment of the present disclosure.

Next, an operation example of the delayed stop control performed by the control system 145 will be described with reference to FIGS. 6 to 11. FIG. 6 is a flowchart showing an operation example of the control system 145 according to the embodiment of the present disclosure. FIGS. 7 to 11 are diagrams showing display examples of the touch panel 145D according to the embodiment of the present disclosure.

Figure 7:
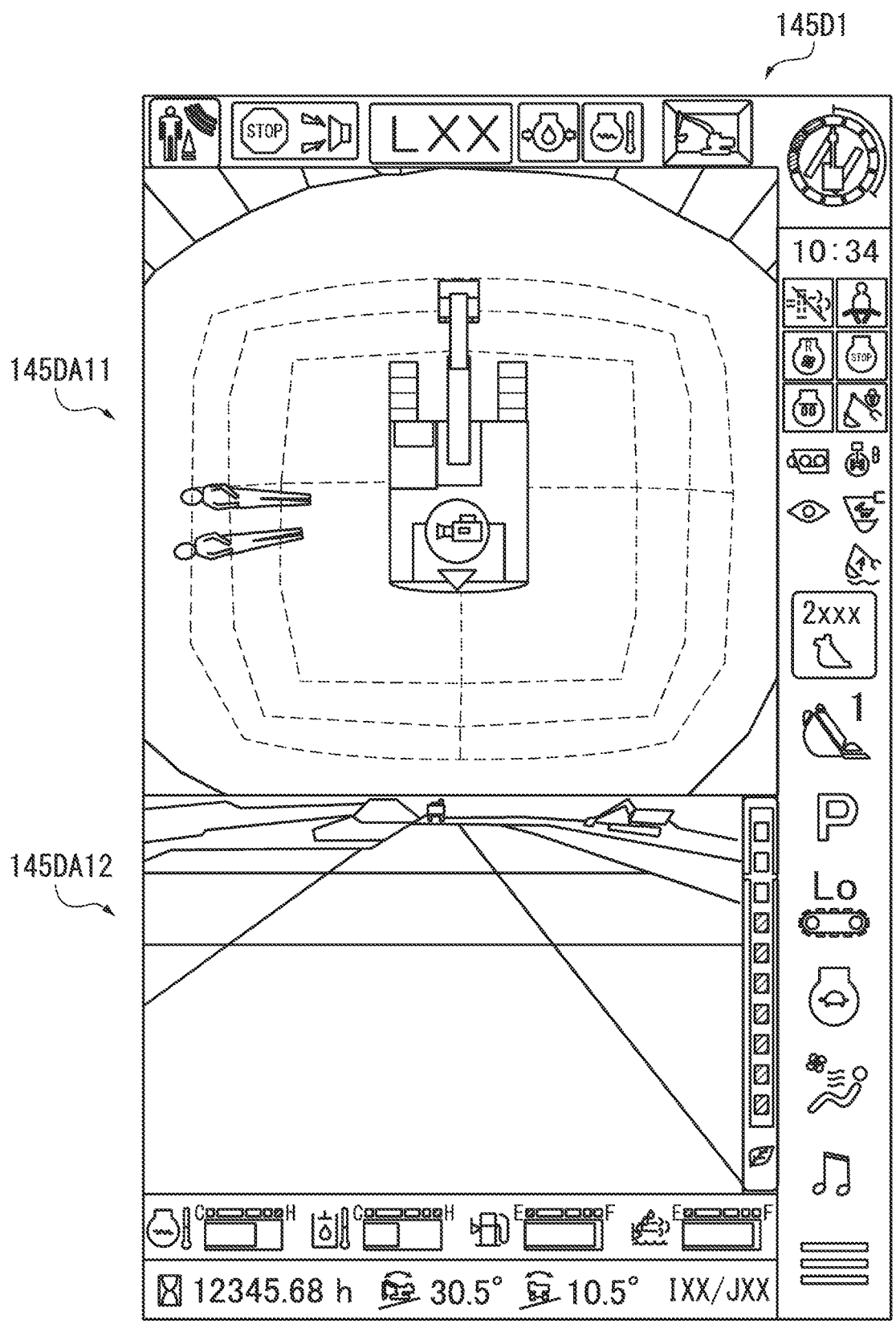
FIG. 7 is a diagram showing a display example according to the embodiment of the present disclosure.

Processing shown in FIG. 6 is started after the engine 121 is started. At the start of the processing shown in FIG. 6, it is assumed that the IGON signal is on and the rotary switch 144 is operated at the IG position 1444. In addition, the touch panel 145D displays a normal display screen 145D1, which is a display in a case where delayed stop control shown in FIG. 7 is not performed, for example. The normal display screen 145D1 includes an overhead image 145DA11 based on images captured by the four cameras 126, a computer graphics image of the work machine 100, and the like, an image 145DA12 captured by one camera 126 of the four cameras 126, predetermined sensor information in the work machine 100, icons representing operation buttons, and the like.

In addition, in the following description, as an example, it is assumed that the starter signal unit 202 in the control system 145 independently performs processing in each step. However, a part or the entirety of the processing of each step may be independently performed by the monitor controller 204, the control controller 205, the engine controller 206, and the like instead of the starter signal unit 202. In addition, in FIG. 6, the rotary switch 144 is abbreviated as "R-SW". In addition, the delayed stop control is abbreviated as "EDS".

When the processing shown in FIG. 6 is started, the starter signal unit 202 first determines whether or not the rotary switch 144 is at the ACC position 1443 or the OFF position 1442 (step S11). In a case where the rotary switch 144 is not at the ACC position 1443 nor at the OFF position 1442 (NO in step S11), the starter signal unit 202 repeatedly performs the determination in step S11 in a predetermined cycle.

When the rotary switch 144 is at the ACC position 1443 or the OFF position 1442 (YES in step S11), the starter signal unit 202 determines whether or not an operating condition of the delayed stop control (EDS operating condition) is established (step S12). The operating condition of the delayed stop control is a condition for determining whether or not to start the delayed stop control. In a case where the operating condition of the delayed stop control is established, the starter signal unit 202 starts the delayed stop control and stops the engine 121 under the delayed stop control. In a case where the operating condition of the delayed stop control is not established, the starter signal unit 202 stops the engine 121 without performing the delayed stop control. The operating condition of the delayed stop control is, for example, a condition in which temperatures at one or a plurality of predetermined points in the exhaust system or the like are equal to or higher than each predetermined temperature threshold. The predetermined temperature threshold is, for example, a temperature value at which it is not desirable to stop the engine 121 in a state equal to or higher than the temperature threshold.

Figure 8:
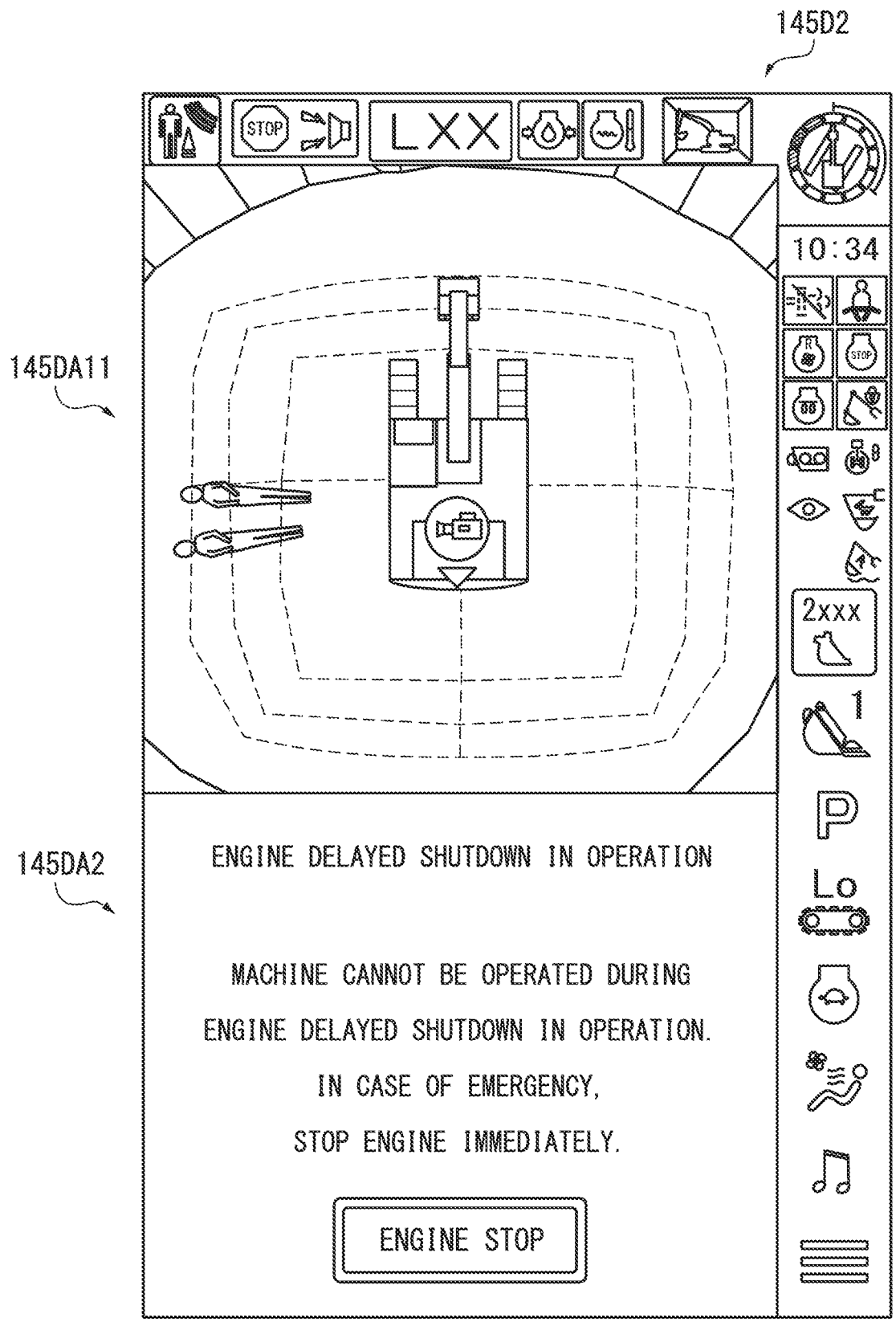
FIG. 8 is a diagram showing a display example according to the embodiment of the present disclosure.

In a case where the operating condition of the delayed stop control is established (YES in step S12), the starter signal unit 202 sets the EDS signal to on (step S13), and performs a delayed stop control in operation display, which is a display of an indication that the delayed stop control is in operation, on the touch panel 145D (step S14). FIG. 8 shows an example of a display screen 145D2 in the display of "in the delayed stop control operation". The display screen 145D2 includes an overhead image 145DA11 and a display region 145DA2 of the display of the indication that the delayed stop control is in operation. In this case, the display region 145DA2 represents the indication that the delayed stop control is in operation by text "ENGINE DELAYED SHUTDOWN IN OPERATION".

Then, the starter signal unit 202 determines whether or not an end condition of the delayed stop control (EDS end condition) is established (step S15). The end condition of the delayed stop control is a condition for determining whether or not to end the delayed stop control by stopping the engine 121. In a case where the end condition of the delayed stop control is established, the starter signal unit 202 ends the delayed stop control by stopping the engine 121. The end condition of the delayed stop control is, for example, a condition in which temperatures at one or a plurality of predetermined points in the exhaust system or the like are lower than each predetermined temperature threshold. The predetermined temperature threshold is, for example, a temperature value at which the engine 121 can be appropriately stopped in a state at lower than the temperature threshold. Alternatively, the end condition of the delayed stop control is, for example, a condition in which a predetermined time or longer has elapsed after the start of the delayed stop control. The predetermined time is, for example, a time sufficient for the temperature to decrease.

Figure 9:
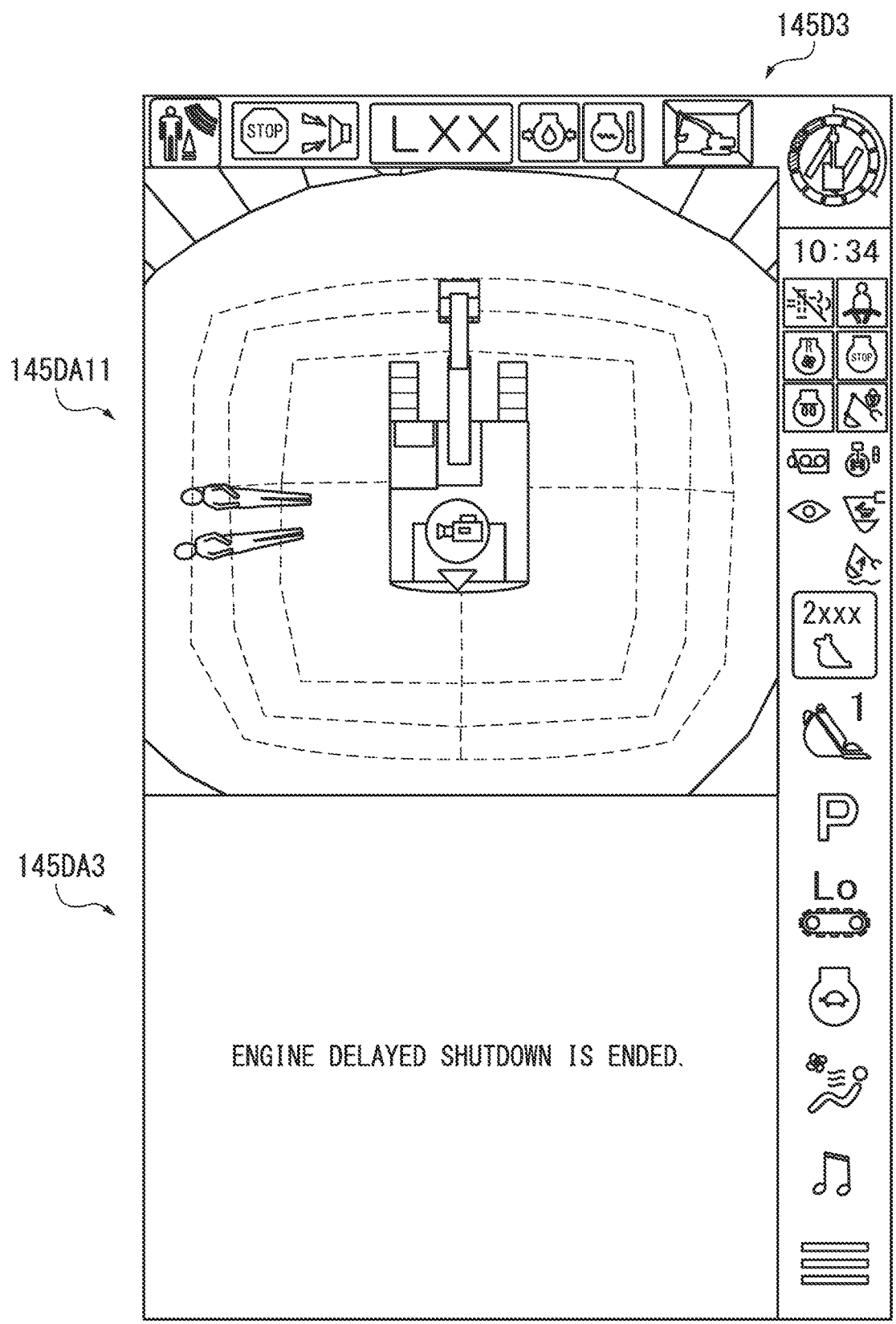
FIG. 9 is a diagram showing a display example according to the embodiment of the present disclosure.

In a case where the end condition of the delayed stop control is established (YES in step S15), the starter signal unit 202 sets the EDS signal to off (step S16), and performs a delayed stop control end notification display, which is a display of an indication that the delayed stop control is ended, on the touch panel 145D (step S17). FIG. 9 shows an example of a display screen 145D3 in the delayed stop control end notification display. The display screen 145D3 includes an overhead image 145DA11 and a display region 145DA3 of the display of the indication that the delayed stop control is ended. In this case, the display region 145DA3 represents the indication that the delayed stop control is ended by text "ENGINE DELAYED SHUTDOWN IS ENDED".

In a case where the delayed stop control end notification display is performed on the touch panel 145D (step S17), or in a case where the operating condition of the delayed stop control is not established (NO in step S12), the starter signal unit 202 sets the IGON signal to off (step S18). In a case where the IGON signal is set to off, the engine controller 206 stops the engine 121.

Next, the starter signal unit 202 determines whether or not the rotary switch 144 is at the ACC position 1443 (step S19). In a case where the rotary switch 144 is at the ACC position 1443 (YES in step S19), when the delayed stop control end notification display is performed in step S17, the starter signal unit 202 displays the normal display screen 145D1 on the touch panel 145D after a predetermined time has elapsed since the delayed stop control end notification display is performed in step S17 (step S20). In a case where the rotary switch 144 is at the ACC position 1443 (YES in step S19), the starter signal unit 202 continues to display the normal display screen 145D1 on the touch panel 145D (step S20).

On the other hand, in a case where the rotary switch 144 is not at the ACC position 1443 (NO in step S19), the starter signal unit 202 determines whether or not the rotary switch 144 is at the OFF position 1442 (step S21). In a case where the rotary switch 144 is at the OFF position 1442 (YES in step S21), when the delayed stop control end notification display is performed in step S17, the starter signal unit 202 turns off the display of the touch panel 145D after a predetermined time has elapsed since the delayed stop control end notification display is performed (step S22) and ends the processing shown in FIG. 6. In a case where the operating condition of the delayed stop control is not established in step S12, the display of the touch panel 145D is turned off after a predetermined time has elapsed (step S22), and the processing shown in FIG. 6 is ended.

In addition, in a case where the rotary switch 144 is not at the OFF position 1442 (NO in step S21), the starter signal unit 202 outputs a signal corresponding to the position of the rotary switch 144, and the control system 145 performs processing according to the position of the rotary switch 144.

On the other hand, in a case where the end condition of the delayed stop control is not established in step S15 (NO in step S15), the starter signal unit 202 determines whether or not the rotary switch 144 is at the IG position 1444 (step S23). In a case where the rotary switch 144 is not at the IG position 1444 (NO in step S23), the starter signal unit 202 determines again whether or not the end condition of the delayed stop control (EDS end condition) is established after a predetermined time (step S15).

Figure 10:
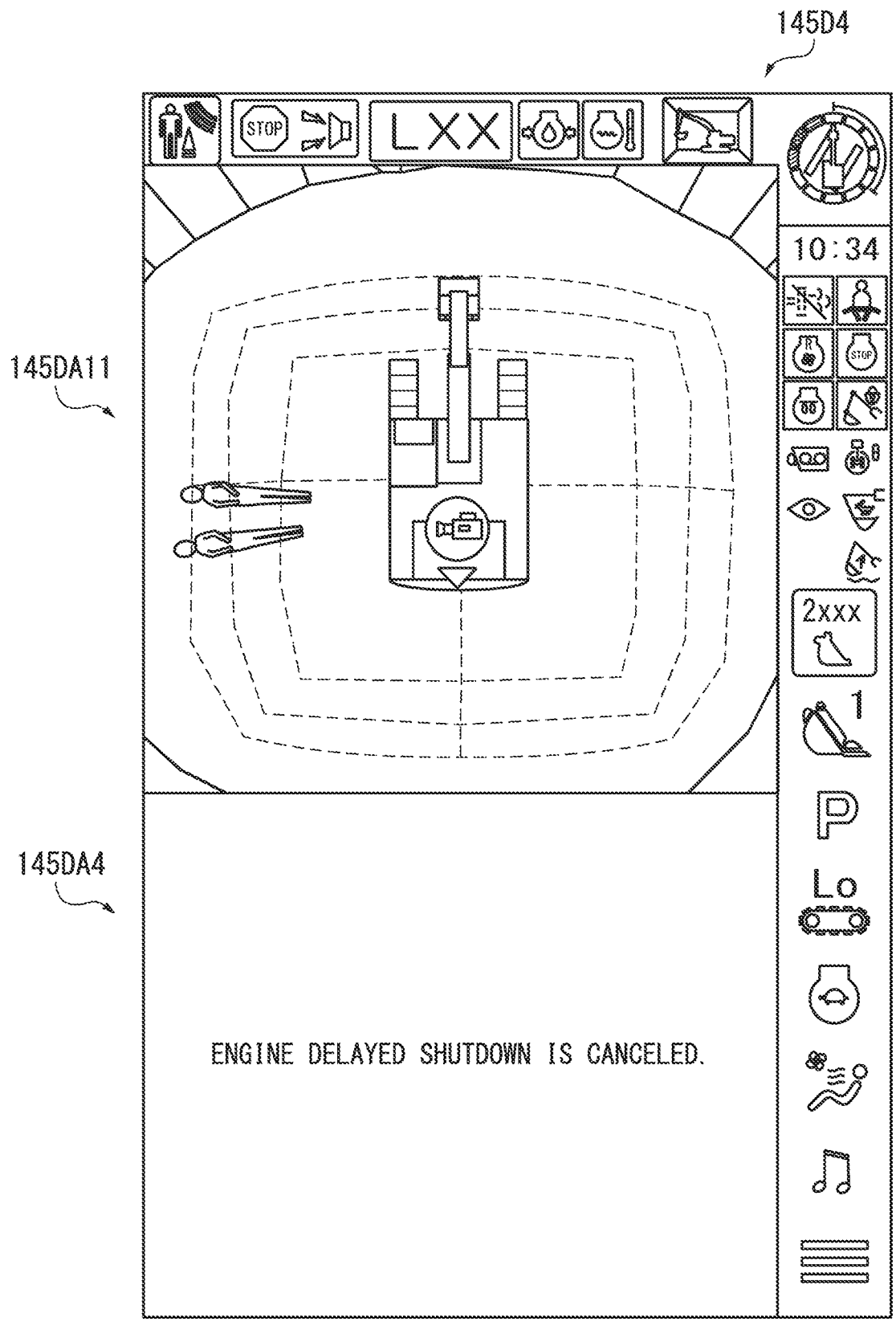
FIG. 10 is a diagram showing a display example according to the embodiment of the present disclosure.

In a case where the rotary switch 144 is at the IG position 1444 (YES in step S23), the starter signal unit 202 determines whether or not the lock lever 143LL is at the locked position (step S24). In a case where the lock lever 143LL is at the locked position (YES in step S24), the starter signal unit 202 sets the EDS signal to off (step S25), and performs a cancellation acceptance display, which is a display of an indication that cancellation of the delayed stop control is accepted, on the touch panel 145D (step S26). FIG. 10 shows an example of a display screen 145D4 in the cancellation acceptance display. The display screen 145D4 includes an overhead image 145DA11 and a display region 145DA4 of the display of the indication that the delayed stop control is canceled. In this case, the display region 145DA4 represents the indication that the delayed stop control is canceled by text "ENGINE DELAYED SHUTDOWN IS CANCELED."

Next, the starter signal unit 202 displays the normal display screen 145D1 on the touch panel 145D after a predetermined time has elapsed since the cancellation acceptance display is performed in step S26 (step S27). Next, the starter signal unit 202 performs the processing of step S11 again.

Figure 11:
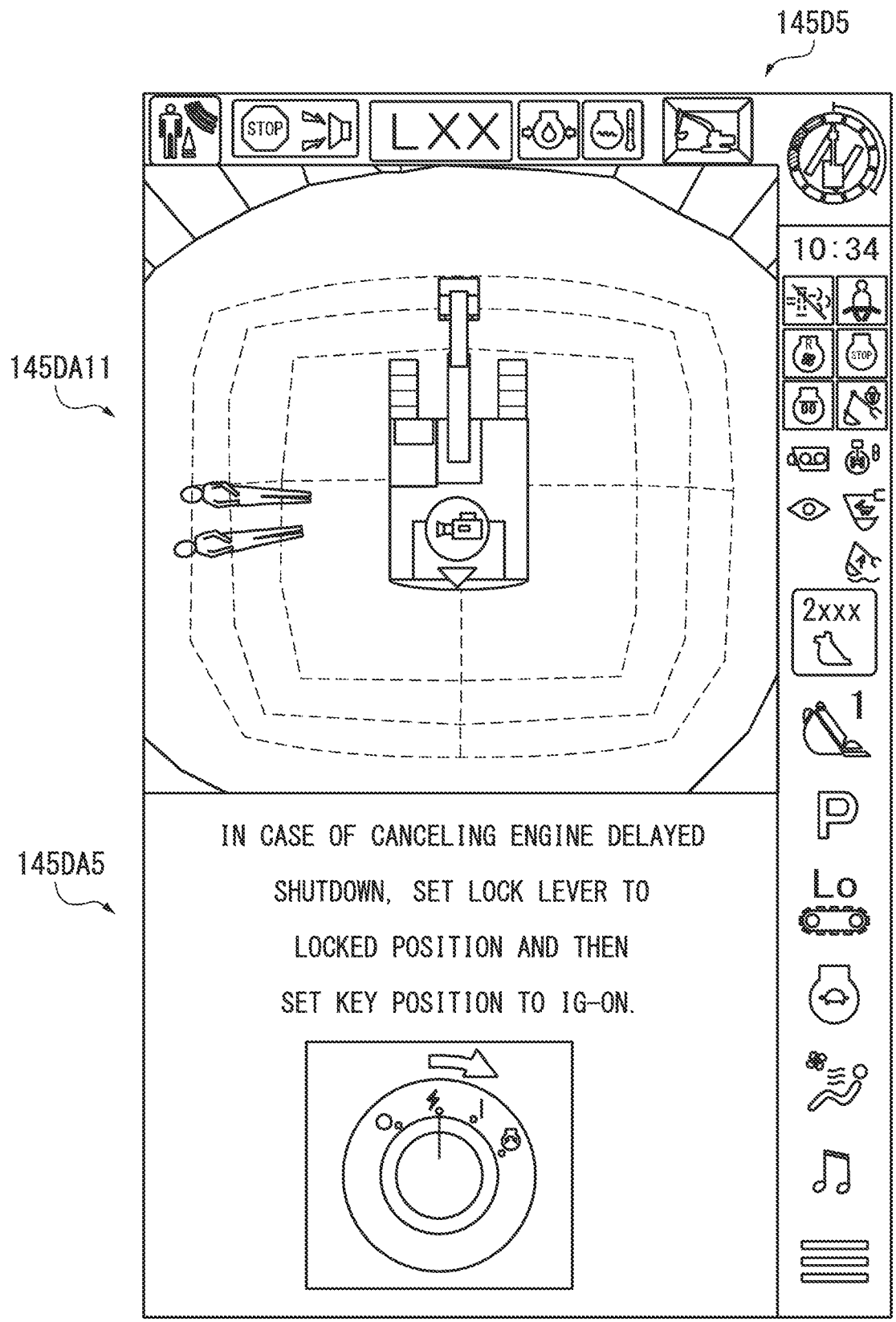
FIG. 11 is a diagram showing a display example according to the embodiment of the present disclosure.

On the other hand, in a case where the lock lever 143LL is not at the locked position (NO in step S24), the starter signal unit 202 performs a cancellation rejection display, which is a display of an indication that cancellation of the delayed stop control is rejected, on the touch panel 145D (step S28). FIG. 11 shows an example of a display screen 145D5 in the cancellation acceptance display. The display screen 145D5 includes an overhead image 145DA11 and a display region 145DA5 of the display of the indication that the cancellation of the delayed stop control is rejected. In this case, the display region 145DA5 includes an image that represents the indication that the cancellation of the delayed stop control is rejected and an indication that the lock lever 143LL is urged to be set to the locked position by text "IN CASE OF CANCELING ENGINE DELAYED SHUTDOWN, SET LOCK LEVER TO LOCKED POSITION AND THEN SET KEY POSITION TO IG-ON." and shows an operation method of the rotary switch 144.

After the cancellation rejection display is performed on the touch panel 145D (step S28), the starter signal unit 202 determines again whether or not the end condition of the delayed stop control (EDS end condition) is established after a predetermined time (step S15).

Through the above processing, for example, in a case where the operator operates the rotary switch 144 to be set to the OFF position 1442 in a state in which the engine 121 is in operation, when the operating condition of the delayed stop control is not established (NO in step S12), the control system 145 stops the engine 121 (step S18) and turns off the touch panel 145D (step S22).

In addition, for example, in a case where the operator operates the rotary switch 144 to be set to the OFF position 1442 in a state in which the engine 121 is in operation, when the operating condition of the delayed stop control is established (YES in step S12), the control system 145 performs the delayed stop control in operation display (FIG. 8) on the touch panel 145D (step S14), performs the delayed stop control end notification display (FIG. 9) on the touch panel 145D (step S17) when the end condition of the delayed stop control is established (YES in step S15), stops the engine 121 (step S18), and turns off the touch panel 145D (step S22).

In a case where the operator operates the rotary switch 144 to be set to the IG position 1444 (YES in step S23) before the end condition of the delayed stop control is established (NO in step S15), when the lock lever 143LL is at the locked position (YES in step S24), the control system 145 suspends the delayed stop control (step S25), performs the cancellation acceptance display (FIG. 10) on the touch panel 145D (step S26), and further performs the normal display (FIG. 7) (step S27).

On the other hand, in a case where the operator operates the rotary switch 144 to be set to the IG position 1444 (YES in step S23) before the end condition of the delayed stop control is established (NO in step S15), when the lock lever 143LL is not at the locked position (NO in step S24), the control system 145 performs the cancellation rejection display (FIG. 11) (step S28), and continues to perform the delayed stop control (step S15 and subsequent steps).

Actions and Effects

As described above, according to the present embodiment, while the delayed stop control to delay the stop of the engine 121 is performed, the delayed stop control can be suspended by operating the rotary switch 144 to be set to the IG position 1444. In addition, in the present embodiment, in a case where the rotary switch 144 is operated to be set to the IG position 1444, as a condition for suspending the delayed stop control, an additional condition is set in which the lock lever 143LL is at the locked position. Accordingly, in a case where the delayed stop control is suspended, the lock lever 143LL is at the locked position. Therefore, the work machine 100 is prevented from operating due to an unintended operation of the operation device 143 while the delayed stop control is suspended.

Another Embodiment

The embodiment has been described above in detail with reference to the drawings; however, the specific configurations are not limited to the above-described configurations, and various design changes or the like can be made. That is, in another embodiment, the order of the above-described processing may be appropriately changed. In addition, parts of the processing may be performed in parallel. In addition, instead of displaying information on the touch panel 145D or together with the display of the information, the information may be output by voice or a notification signal. In addition, in the above-described embodiment, the rotary switch 144 is operated to be set to the IG position 1444 to provide an instruction to suspend the delayed stop control, but the present invention is not limited thereto. For example, the instruction may be performed by, in addition to operating the rotary switch 144 to be set to the IG position 1444, for example, a predetermined input operation such as touching a predetermined button on the touch panel 145D or an operation of pressing a predetermined switch on the touch panel 145D or a predetermined input device such as a predetermined switch.

In the control system 145 according to the above-described embodiment, a portion of the configurations constituting the control system 145 may be mounted inside the work machine 100, and other configurations may be provided outside the work machine 100.

Computer Configuration

Each of the devices provided in the control system 145 described above, such as the starter signal unit 202, the gateway function controller 203, the monitor controller 204, the control controller 205, or the engine controller 206 can be configured by using a computer such as a microcomputer or a central processing unit (CPU) and hardware such as computer peripheral circuits and peripheral devices. In addition, the computer may be configured by using a custom large scale integrated circuit (LSI), such as a programmable logic device (PLD). Examples of the PLD include a programmable array logic (PAL), a generic array logic (GAL), a complex programmable logic device (CPLD), and a field programmable gate array (FPGA). In this case, some or all of functions to be realized by a processor may be realized by the corresponding integrated circuit.

Basic Configuration Example

Figure 12:
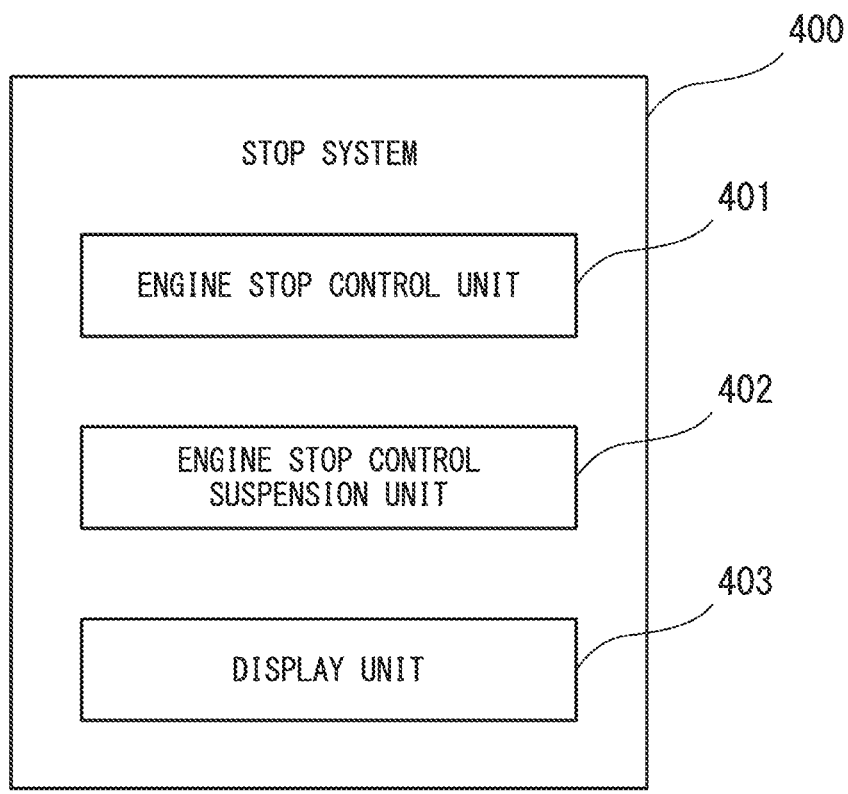
FIG. 12 is a functional block diagram according to the embodiment of the present disclosure.

Next, a basic configuration example according to an embodiment of the present disclosure corresponding to the above-described embodiment will be described with reference to FIG. 12. FIG. 12 is a functional block diagram according to the embodiment of the present disclosure. A stop system 400 shown in FIG. 12 is a configuration corresponding to the control system 145 shown in FIG. 5, and includes an engine stop control unit 401, an engine stop control suspension unit 402, and a display unit 403. However, the display unit 403 may be omitted.

In a case where there is a stop instruction that instructs to stop the engine 121 of the work machine 100, the engine stop control unit 401 performs the delayed stop control to delay the stop of the engine 121 until a predetermined condition is established, and then stop the engine 121. Here, the stop instruction corresponds to, for example, an input operation of setting the rotary switch 144 to the OFF position 1442 or the ACC position 1443. The predetermined condition corresponds to the delayed stop control end condition determined in step S15. The engine stop control unit 401 corresponds to the starter signal unit 202 that performs the determination processing of step S11, the determination processing of step S15, the processing of step S18, and the like.

In a case where there is a cancellation instruction to cancel the stop instruction (YES in step S23), when the lock lever 143LL of the work machine 100 is at the locked position (YES in step S24), the engine stop control suspension unit 402 suspends the delayed stop control (step S25). When the lock lever 143LL is at the unlocked position (NO in step S24), the engine stop control suspension unit 402 continues to perform the delayed stop control. Here, the cancellation instruction corresponds to, for example, an input operation of switching the rotary switch 144 from the OFF position 1442 or the ACC position 1443 to the IG position 1444. The engine stop control suspension unit 402 corresponds to the starter signal unit 202 that performs the determination processing of step S23, the determination processing of step S24, the processing of step S25, and the like.

When the lock lever 143LL is at the unlocked position (NO in step S24) in a case where there is the cancellation instruction (YES in step S23), and thereafter there is the cancellation instruction again (YES in step S23), in a case where the lock lever 143LL is set to the locked position (YES in step S24), the engine stop control suspension unit 402 may suspend the delayed stop control.

In addition, in a case where there is the cancellation instruction (YES in step S23), the display unit 403 may change display contents between when the lock lever 143LL is at the locked position (YES in step S24) and when the lock lever 143LL is at the unlocked position (NO in step S24) to the cancellation acceptance display (step S26) or the cancellation rejection display (step S28).

In addition, in a case where there is the cancellation instruction (YES in step S23), when the lock lever 143LL is at the unlocked position (NO in step S24), the display unit 403 may perform the display (FIG. 11) urging the lock lever 143LL to be set to the locked position (step S28).

In addition, in a case where there is the cancellation instruction (YES in step S23), when the lock lever 143LL is at the locked position (YES in step S24), the display unit 403 may perform the display (FIG. 10) of the indication that the delayed stop control is suspended (step S26).

The cancellation instruction is given, for example, by an operation of turning on an ignition switch of the engine 121. In the embodiment, the operation of turning on the ignition switch corresponds to the operation of setting the rotary switch 144 to the IG position 1444.

Alternatively, the cancellation instruction is given by the operation of turning on the ignition switch of the engine 121 or a predetermined input operation for a predetermined input device. Here, the predetermined input operation for the predetermined input device corresponds to a predetermined input operation such as touching a predetermined button on the touch panel 145D or an operation of pressing a predetermined switch on the touch panel 145D or a predetermined input device such as a predetermined switch, which has been described as a modification example of the embodiment.

According to the engine stop system 400 of the work machine shown in FIG. 12, while the control to delay the stop of the engine is performed, the control can be suspended.

According to each of the aspects of the present invention, while the control to delay the stop of the engine is performed, the control can be suspended.

What is claimed is:
1. A stop system for an engine of a work machine, the stop system comprising:
 a controller including a processor,
 the controller being configured to, in a case in which there is a stop instruction that instructs to stop the engine of the work machine,
  perform delayed stop control to delay the stop of the engine until a
   predetermined condition is established, and
   then stop the engine; and the controller being further configured to, in a case in which there is a cancellation instruction to cancel the stop instruction,
 suspend the delayed stop control when work equipment of the work machine is in a locked state, and
 continue to perform the delayed stop control regardless of the cancellation instruction when the work equipment is in an unlocked state.

2. The stop system for an engine of a work machine according to claim 1, wherein
 when the work equipment is in the unlocked state in the case in which there is the cancellation instruction, and thereafter there is the cancellation instruction again after the work equipment enters the locked state, the controller suspends the delayed stop control.

3. The stop system for an engine of a work machine according to claim 1, further comprising:
 a display operably connected to the controller, the display being configured to perform a display pertaining to the delayed stop control,
 in the case in which there is the cancellation instruction, the controller changes a display content of the display between when the work equipment is in the locked state and when the work equipment is in the unlocked state.

4. The stop system for an engine of a work machine according to claim 3, wherein
 in the case in which there is the cancellation instruction, when the work equipment is in the unlocked state, the controller controls the display to display content urging an operator to set the work equipment to the locked state.

5. The stop system for an engine of a work machine according to claim 3, wherein
 in the case in which there is the cancellation instruction, when the work equipment is in the locked state, the controller controls the display to display an indication that the delayed stop control is suspended.

6. The stop system for an engine of a work machine according to claim 1, wherein
 the cancellation instruction is given by an operation of turning on an ignition switch of the engine.

7. The stop system for an engine of a work machine according to claim 1, wherein
 the cancellation instruction is given by an operation of turning on an ignition switch of the engine, or a predetermined input operation performed on a predetermined input device.

8. A stop method for an engine of a work machine, the stop method comprising:
 in a case in which there is a stop instruction that instructs to stop the engine of the work machine,
  performing delayed stop control to delay the stop of the engine until a predetermined condition is established, and
  then stopping the engine; and
 in a case in which there is a cancellation instruction to cancel the stop instruction,
  suspending the delayed stop control when work equipment of the work machine is in a locked state, and
  continuing to perform the delayed stop control regardless of the cancellation instruction when the work equipment is in an unlocked state.

* * * * *